US005524076A

United States Patent [19]
Rolland et al.

[11] Patent Number: 5,524,076
[45] Date of Patent: Jun. 4, 1996

[54] CHIRP CONTROL OF A MACH-ZEHNDER OPTICAL MODULATOR USING NON-EQUAL POWER SPLITTING

[75] Inventors: Claude Rolland, Ottawa; John C. Cartledge, Kingston, both of Canada

[73] Assignee: Northern Telecom Limited, Montreal, Canada

[21] Appl. No.: 450,841

[22] Filed: May 25, 1995

Related U.S. Application Data

[63] Continuation of Ser. No. 188,000, Jan. 28, 1994, abandoned.

[51] Int. Cl.$^6$ .................................................. G02B 6/10
[52] U.S. Cl. ................................. 385/8; 385/2; 385/14; 385/45
[58] Field of Search ........................ 385/8, 9, 11, 1, 385/2, 3, 14, 40, 41, 48, 43–45

[56] References Cited

U.S. PATENT DOCUMENTS

| | | | |
|---|---|---|---|
| 4,709,978 | 12/1987 | Jackel | 385/3 |
| 4,846,540 | 7/1989 | Kapon | 385/45 |
| 4,878,723 | 11/1989 | Chen et al. | 385/14 |
| 5,091,980 | 2/1992 | Ogawa et al. | 385/3 |
| 5,151,959 | 9/1992 | Mueller et al. | 385/50 |
| 5,285,507 | 2/1994 | Van Der Tol | 385/11 |
| 5,293,436 | 3/1994 | Diemeer | 385/11 |
| 5,303,079 | 4/1994 | Gnauck et al. | 385/8 X |
| 5,315,422 | 5/1994 | Utaka et al. | 385/3 |
| 5,333,219 | 7/1994 | Kuznetsov | 385/45 |
| 5,353,114 | 10/1994 | Hansen | 385/14 |
| 5,361,157 | 11/1994 | Ishikawa et al. | 385/9 X |
| 5,408,544 | 4/1995 | Seino | 385/3 |

OTHER PUBLICATIONS

"10 Gb/s Transmission in Large–Dispersion Fiber Using Ti:18Nbo3 Mach–Zehnder Modulator", Okiyama et al, Conf. Integrated Opticas and Optical Fiber Communication, pp. 206–209, Kobe, Japan Jul. 1989.

"Dispersion Penalty Reduction Using an Optical Modulator with Adjustable Chirp", Gnauck et al, Proc. Opt. Fiber commun., pp. 78–81 (no month) 1991.

"10 Gb/s, 120 km Normal Fiber Transmission Experiment Using a 1.56 µm Multiple Quantum Well InP/GaAsP Mach–Zehnder Modulator", Rolland et al, Optical Fiber Conference, pp. 111–114 Feb. 1993.

"Dispersion Penalty Reduction Using an Optical Modulator with Adjustable Chirp", Gnauck et al, IEEE Photonics Technology Letters, vol. 3, No. 10, pp. 916–918 Oct. 1991.

"High–Speed, Low Power Optical Modualtor with Adjustable Chirp Parameter", Korotky et al, Integrated Photonics Research, pp. 53–54 (no month) 1991.

"10 Gbit/s, 1.56 µm Multiqunatum Well InP/InGaAsP Mach–Zehnder Modulator", Rolland et al, Electronics Letters, vol. 29, No. 5, pp. 471–472 Mar. 1993.

"Optimization of Strongly Guiding Semiconductor Rib Waveguide Y–Junctions", Rolland et al, IEEE Photonics Technology Letters, Vo. 2, No. 6, pp. 404–406 Jun. 1990.

*Primary Examiner*—Rodney B. Bovernick
*Assistant Examiner*—Hemang Sanghavi
*Attorney, Agent, or Firm*—George MacGregor

[57] ABSTRACT

A Mach-Zehnder optical modulator in which the chirp parameter can be varied by adjusting the optical power splitting ratio between the two arms of the interferometer. The modulating voltage is supplied to a single arm or alternatively to both arms in a push-pull configuration. For an appropriate power splitting ratio negative chirp is achieved with approximately equal push-pull modulating drive voltage. This results in optimum distance and bit rate characteristics with low drive power.

16 Claims, 4 Drawing Sheets

CHIRP CONTROL OF A MACH-ZEHNDER OPTICAL MODULATOR USING NON-EQUAL POWER SPLITTING

This is a Continuation of U.S. Pat. application Ser. No. 08/188,000, filed on 28 Jan. 1994 by C. Rolland et al, for "CHIRP CONTROL OF A MACH-ZEHNDER OPTICAL MODULATOR USING NON-EQUAL POWER SPLITTING" now abandoned.

FIELD OF THE INVENTION

This invention relates to a Mach-Zehnder optical modulator and more particularly to such an optical modulator wherein the chirp parameter can be varied by adjusting the optical power splitting ratio between the two arms of the interferometer.

BACKGROUND OF THE INVENTION

For high bit rate, long-haul communications via optical fibers appropriate light sources serving as the transmitter are essential. Semiconductor lasers can be modulated at high speeds and consequently are used extensively in optical transmission systems. As the demand grows for bit rates of 10 Gb/s or more, certain inherent properties of semiconductor lasers come into effect. One of these inherent properties is 'chirping' which is a change in the wavelength when the laser is modulated at high bit rates.

The chirping phenomenon in conjunction with the transmission characteristics of a single-mode optical fiber can limit the bit rate times distance product achievable in an optical transmission system. The transmission characteristic of particular importance is fiber dispersion and its effect is dependent on the wavelength of the transmitted signal. Single mode optical fibers are also subject to losses due to absorption. The minimum absorption loss occurs at a wavelength of approximately 1.55 μm whereas the minimum dispersion occurs at a wavelength of approximately 1.3 μm. Inasmuch as the absorption loss has a greater impact on long-haul transmission, lasers which emit in the wavelength range of 1.5–1.6 μm are usually used. The dispersion of the single mode fiber at wavelengths of 1.5 to 1.6 μm results in pulse broadening or intersymbol interference as the digital optical pulse passes through the fiber. Obviously, as the bit rate increases the effects of pulse broadening as a function of transmission distance becomes more acute and ultimately limits the bit rate and/or transmission distance. The dispersion effects are, of course, compounded by the inherent chirping properties of the semiconductor laser which add to the pulse broadening and further limit the bit rate.

PRIOR ART

In order to negate the effects of laser 'chirping', it is known to operate a 1.5–1.6 μm laser in continuous wave (CW) mode and to switch the light beam on and off at the appropriate bit rate utilizing an optical modulator. One such modulator is a Mach-Zehnder interferometer. A Mach-Zehnder interferometer comprises a pair of waveguide channels or arms connected between an optical waveguide splitter, and a waveguide combiner. A light source is optically coupled to the waveguide splitter which serves as a Y-branch splitter or directional coupler. The two light beams from the splitter travel through the waveguide arms and are reunited or combined by the waveguide combiner. Electrodes are associated with the waveguide arms and by providing modulating voltage to one or both electrodes the relative phases of the two light beams may be altered. Under one arm or single arm modulation, the switching voltage, e.g., 0 to $-V_\pi$, is provided to one of the arms while the other arm is held at a constant voltage, e.g., $-V_\pi$ for negative chirp mode. In both arm or dual arm modulation the voltage is divided between the two arms, for example, 0 to $-V_\pi/2$ on one arm and $-V_\pi/2$ to $-v_\pi$ on the other. In any event, without modulating voltage the two beams arrive at the waveguide combiner in phase giving an intensity maximum or an 'on' condition. Conversely, a modulating voltage supplied to one or both arms results in a differential phase change giving rise to minimum transmission. An appropriate modulating voltage results in beam extinction or an 'off' condition. Hence, the optical modulator can be used to convert the CW operated laser output into a digital signal. The laser operating in CW mode does not introduce 'chirp' so that the bit rate limit then depends significantly on the characteristics of the optical modulator.

Okiyama et al ("10 Gb/s Transmission in large-Dispersion Fiber Using Ti:LiNbO$_3$ Mach-Zehnder Modulator", Conf. Integrated Optics and Optical Fiber Communication, Kobe, Japan, 1989) reported that Mach-Zehnder modulators fabricated from titanium doped lithium niobate (Ti:LiNbO$_3$) could modulate a CW laser at bit rates up to 10 Gb/s although chirping in the modulator was noted.

Korotky et al ("High-Speed Low Power Optical Modulator With Adjustable Chirp Parameter", Topical Meeting on Integrated Photonics Research, Monterey, Calif., 1991) reported that the chirp of a LiNbO$_3$ modulator could be controlled by selecting different voltage ratios supplied to the modulating electrodes. Korotky et al found that the modulator could be rendered 'chirpless' although such condition was not necessarily ideal and that some negative chirp could be used to advantage.

Gnauck et al ("Dispersion Penalty Reduction Using An Optical Modulator With Adjustable Chirp", Photonics Tech. Lett., Vol. 3, pp. 916–918, 1991) reported that Ti:LiNbO$_3$ Mach-Zehnder modulators could be operated not only chirpless but with negative chirp and that slightly negative values might reduce pulse broadening and hence lower the dispersion penalty.

Rolland et al ("10 Gb/s 120 km Normal Fiber Transmission Experiment Using a 1.56 μm Multiple Quantum Well InP/InGaAP Mach-Zehnder Modulator", Conf. Optical Fiber Communication, San Jose, Calif., 1993) describe a Mach-Zehnder modulator of III–V semiconductor material capable of 10 Gb/s transmission over 120 Km. Some degree of chirp regulation was reported.

SUMMARY OF THE INVENTION

Applicants have now determined that the chirp of a Mach-Zehnder optical modulator can be varied by adjusting the ratio of the optical power incident on the respective arms of the interferometer. In a preferred embodiment an asymmetrical optical power ratio is established and the modulating voltage is maintained under approximately equal push-pull drive conditions. This results in low drive power consumption.

It is accordingly an object of the present invention to provide a Mach-Zehnder optical modulator having means to adjust the chirp parameters.

It is a further object of the invention to provide a Mach-Zehnder optical modulator with chirp control utilizing approximately equal push-pull modulating voltage which is advantageously, the condition for minimum drive power.

It is yet a further object of the invention to provide a Mach-Zehnder optical modulator wherein chirp control is achieved by adjusting the optical power splitting ratio between the arms of the interferometer.

It is still a further object of the invention to provide a Mach-Zehnder optical modulator with chirp control wherein the modulator is fabricated in a III-V alloy or an alternate material such as lithium niobate.

Therefore in accordance with a first aspect of the present invention there is provided a Mach-Zehnder optical modulator having chirp control comprising an optical waveguide splitter, an optical waveguide combiner and a pair of waveguide channels or arms therebetween. Electrodes for providing modulation voltage are associated with each arm. The modulator also has means to control the ratio of the optical power between the individual waveguide arms.

In accordance with a second aspect of the invention there is provided a method of controlling the chirp parameter of a Mach-Zehnder optical modulator wherein the modulator includes an optical waveguide splitter and an optical waveguide combiner with interconnected waveguide arms therebetween. Electrodes associated with each arm are adapted to receive modulation voltage to act on the respective arms. The method comprises supplying modulation voltage to at least one of the electrodes and selecting an optical power ratio between the arms so as to vary the chirp parameter of the modulator.

BRIEF DESCRIPTION OF THE DRAWING

The invention will now be described in greater detail with reference to the attached drawings wherein.

DETAILED DESCRIPTION OF THE INVENTION

Figures 1, 1A:
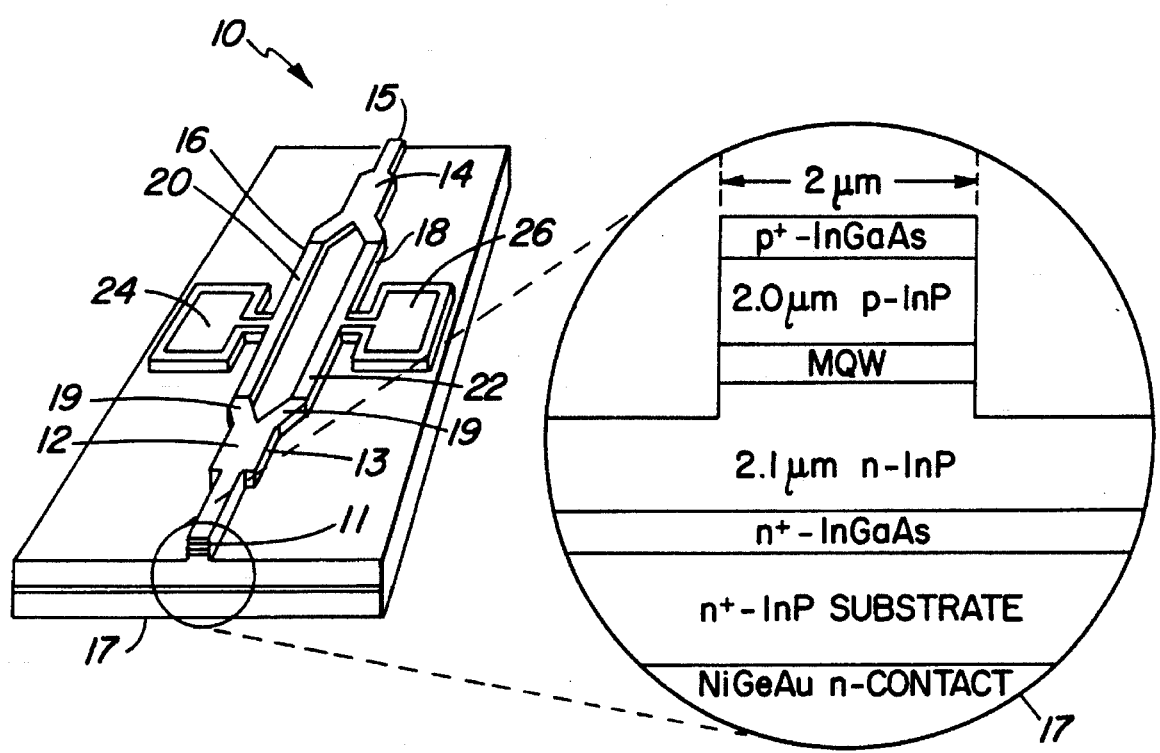
FIG. 1 is a schematic diagram of a multi quantum well Mach-Zehnder optical modulator.
FIG. 1A is an enlarged end view of the modulator of FIG. 1.

Referring initially to FIG. 1, there is illustrated a Mach-Zehnder optical modulator according to the present invention. The modulator 10 comprises an optical waveguide splitter also known herein as an input Y-branch waveguide 12, an optical waveguide combiner or output Y-branch waveguide 14 and interconnected waveguide arms 16 and 18. Electrodes 20 and 22 associated with arms 16 and 18 are located on the top surface of the waveguides. Contacts to the electrodes 20,22 are via contact pads 24,26 respectively. A lower contact 17, as best seen in FIG. 1A, is formed on the device for push-pull operation, although it is to be understood that an alternate location for contact 17 is possible as long as the electric field is directed through the multiquantum well (MQW). III-V optical modulators are described in co-pending U.S. patent application Ser. No. 08/091,708 filed Jul. 15, 1993, which is hereby incorporated by reference.

In operation, light from a semiconductor laser (not shown) operated in continuous wave mode is coupled via an optical coupler (not shown) to the input 11 of input Y-branch waveguide 12. The beam is split by the input Y-branch waveguide and the two beams travel along arms 16 and 18 and combine or reunite in output Y-branch waveguide 14. The reunited beam exits the modulator at end 15 of the output Y-branch 14. As taught by the prior art an electro-optic effect in the arms 16,18 provides a phase change in the light propagating through the arms depending on the modulating voltage applied to the electrodes. Thus, with no modulating voltage the beams travelling through arms 16 and 18 arrive at the output Y-branch 14 in-phase resulting in a signal maximum provided that arms 16 and 18 are of equal length. If a voltage is applied to one of the arms a differential change occurs, due to the electro-optic effect, and the signals arrive at the output out of phase. The resulting beam excites higher order modes in the optical waveguide combiner, or output Y-junction and the radiation gets scattered out by propagating through the single output mode section 15. Thus by controlling the modulation voltage to one, or both of the arms, the device can be operated to convert a continuous wave into a high bit rate modulated signal.

Early Mach-Zehnder interferometers were fabricated using material such as titanium doped lithium niobate (Ti:LiNbO$_3$). More recently, however, Mach-Zehnder devices have been fabricated utilizing III-V alloy compounds such as InGaAsP. In the device 10 of FIG. 1 the input Y-branch or waveguide splitter 12 consists of a single mode waveguide 11 followed by a 40 μm long, 4 μm wide ridge, triple mode section 13 and two 100 μm long S-bends 19. Waveguide splitters are described by C. Rolland et al in IEEE Photonics Technology Letters, Vol. 2, No. 6, June 1990, pp. 404–406, which is hereby incorporated by reference. The output Y-branch or optical waveguide combiner 14 has similar dimensions. The two waveguide arms 16 and 18 are approximately 600 μm long and separated by approximately 20 μm. As indicated in the enlarged end view of the modulator in FIG. 1A, the InGaAsP device has a p-i-n structure with multi-quantum wells in the intrinsic regions. The single mode waveguide sections 16,18 are nominally 2 μm wide and 3 μm deep. Electrodes are provided for the purpose of supplying modulation voltage to arms 16 and 18 as previously discussed.

In accordance with one aspect of the invention the modulator is driven by either single arm modulation voltage or dual arm modulation voltage. Preferably the dual arm modulation is provided in a push-pull mode and more preferably the push-pull modulation is approximately equal inasmuch as this results in the lowest power drive requirements.

In the preferred embodiment the ratio of the optical power incident at the input of arms 16 and 18 is varied. One way of achieving this effect is to incorporate, as an input Y-branch waveguide, an asymmetrical beam splitter.

Asymmetrical beam splitters per se are known and will not be described in detail here. In accordance with the invention, however, design criteria are satisfied which results in controlled ratios of the input beam being incident on the respective waveguide arms. As the physical configuration of the waveguide arms also has an influence on the ratio of the optical power in each arm, asymmetrical design of the arms as a mode of ratio selecting is also contemplated by the present invention. In any event, the percentage of the input beam incident on the respective arms is variable so as to achieve the ratios given in the following description.

In a simulated optical transmission system, the CW output of a DFB semiconductor laser operating at a wavelength of 1.55 μm is coupled to the input Y-branch of the modulator of FIG. 1. The output of the modulator is coupled into single mode optical fibers of known lengths. The fiber dispersion coefficient is 17 ps/(km-nm). The receiver at the end of the fiber is an avalanche photodiode having a quantum efficiency of 0.8, an average gain of 10, a gain bandwidth product of 70 GHz, an ionization coefficient ratio of 0.4 and a dark current of 10 nA. A receiver filter having a bandwidth of 7.5 GHz is employed.

The modulator may be driven in two modes, i.e., single arm modulation or dual arm modulation. In the case of single arm modulation, the voltage applied to arm 16 is, according to one example, modulated between 0 v and −4.70 v (>$\Delta V_{16,in}$=−4.70 V) and the voltage to arm 18 is fixed at −5.52 V. In the dual arm modulation mode, modulating signals are applied to both arms in a push-pull configuration. In this particular calculation, the voltage to arm 16 is modulated between −2.76 V and −5.91 V ($\Delta\Delta V_{16,in}$=3.15 V) and the voltage to arm 18 is modulated between −2.76 V and −0.16 V ($\Delta V_{18,in}$=2.6 V).

Figure 2:
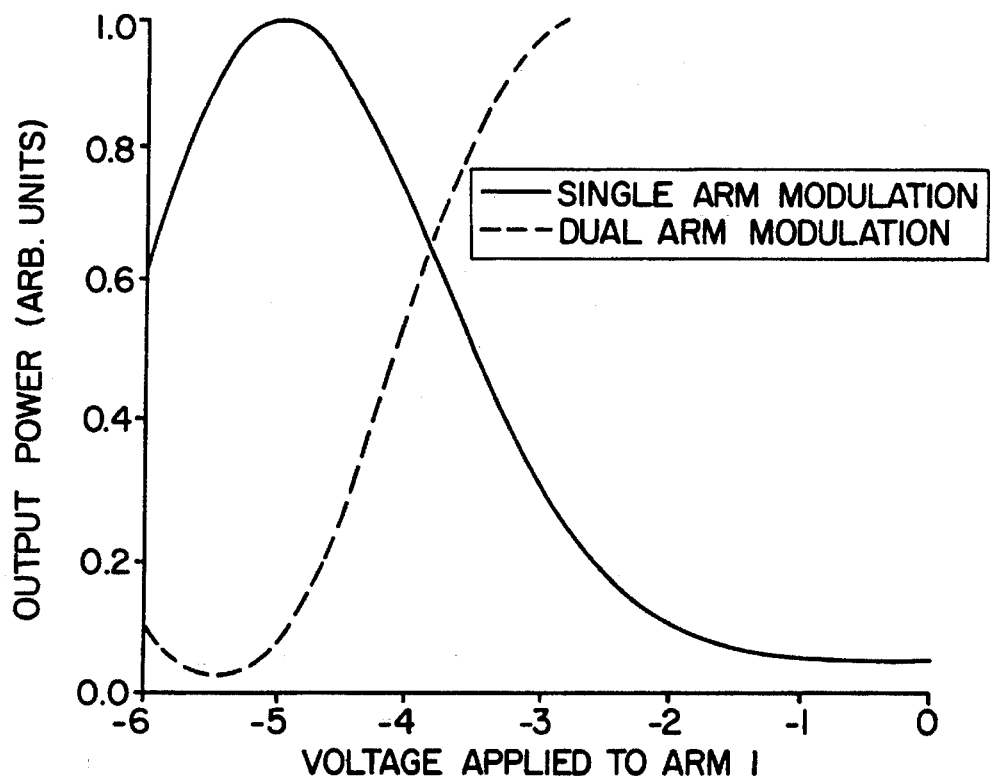
FIG. 2 illustrates transmission curves for an optical modulator as a function of modulation voltage.

FIG. 2 illustrates, in arbitrary units, the output power of the modulator of FIG. 1 as a function of voltage applied to arm 16. The solid curve refers to results with single arm modulation while the dashed curve is for dual arm modulation.

Figure 3:
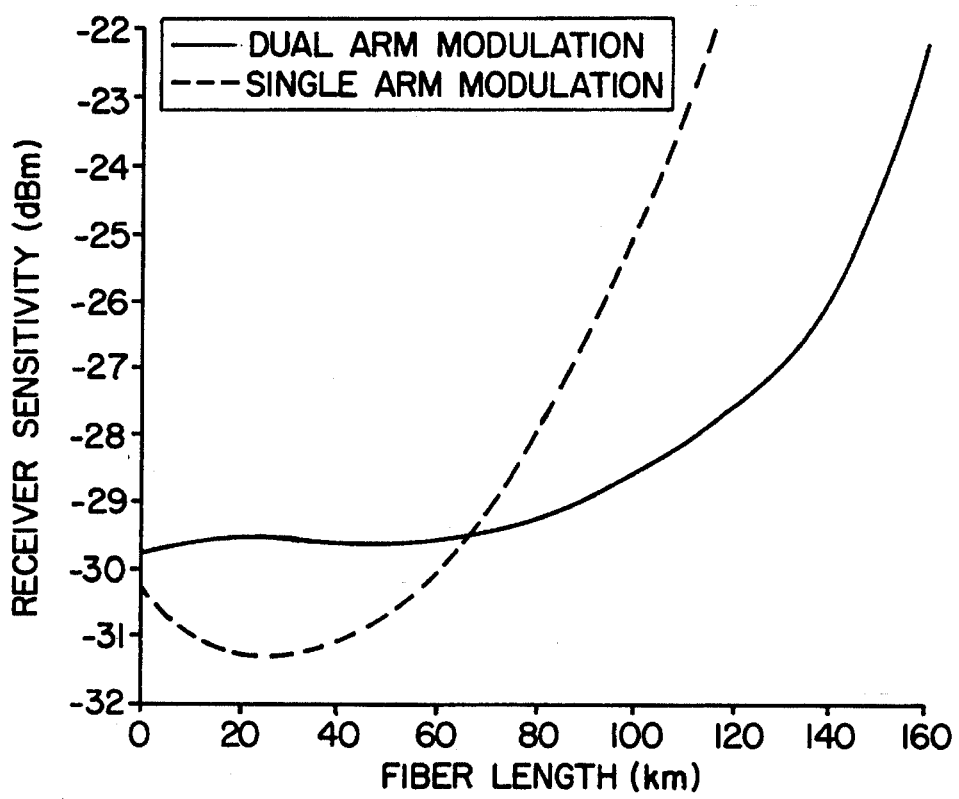
FIG. 3 illustrates the dependence of the receiver sensitivity on fiber length for single and dual arm modulation.

FIG. 3 illustrates the receiver sensitivity as a function of fiber length for both single arm modulation and dual arm modulation. The curves of FIG. 3 are for the situation in which there is equal optical power in each arm of the modulator. These results show that for single arm modulation the receiver sensitivity initially improves with increasing fiber length but then worsens for lengths greater than 60 km. Under dual arm modulation the receiver sensitivity remains substantially constant up to approximately 80 km and then worsens gradually to about 140 km and then worsens rather quickly.

Figure 4:
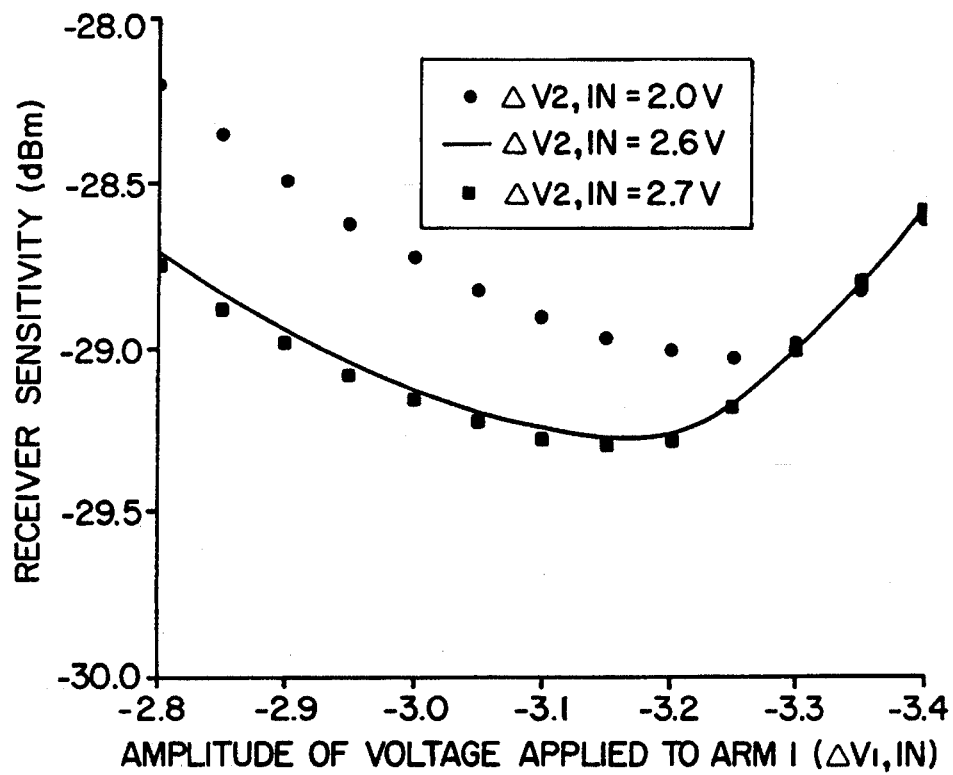
FIG. 4 shows the dependence of the receiver sensitivity on the modulation voltage amplitude applied to the first arm for different values of modulation voltage amplitude applied to the arm.

The effects of variations in amplitude of the modulation signals for dual arm modulation on receiver sensitivity for a fiber length of 80 km are shown in FIG. 4. The solid circles indicate the receiver sensitivity as a function of the amplitude of the voltage applied to arm 16, (i.e., $\Delta V_{16,in}$ for $\Delta V_{18,in}$=2.0 V). The line illustrates the relationship for $\Delta V_{18,in}$=2.6 V and the solid squares show the relationship for $\Delta V_{18,in}$=2.7 V. It will be noted that the performance is dependent on the amplitudes of the voltage applied to both arms.

These results show empirically that the modulation voltage applied to the respective arms of the modulator can alter the dispersion penalty for a given length of fiber. This is due to the controlled introduction of chirp to the modulated signal by the optical modulator. Negative chirp, for example, initially compresses the optical pulse, which serves to extend the upper limit of the distance obtainable before pulse broadening caused by the dispersive fiber becomes the limiting factor.

The foregoing discussion relates to modulators wherein the input Y-branch or beam splitter delivers equal optical power to respective waveguide arms. The present specification now considers the effect on chirp characteristics of various optical power ratios incident on respective arms.

Figure 5:
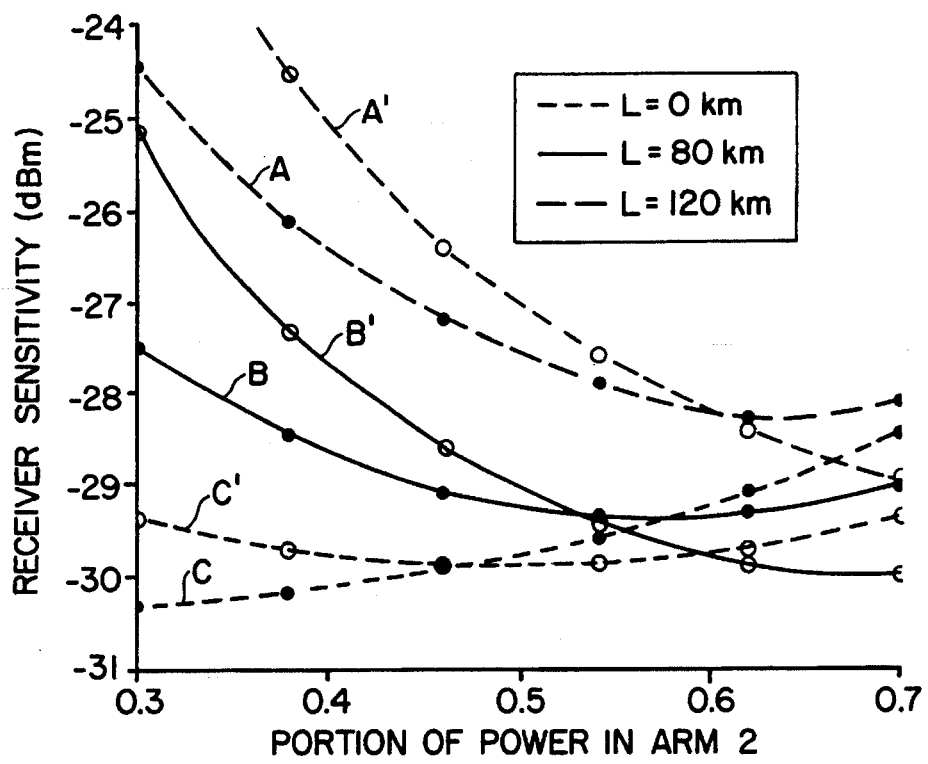
FIG. 5 shows the dependence of the receiver sensitivity on the portion of optical power in the second arm of the modulator for different fiber lengths.

The optical modulator of FIG. 1 was provided with the appropriate beam splitters to permit selection of various ratios of incident light on the waveguide arms. The beam exiting the modulator was detected by the receiver previously discussed. Calculations were made without fiber and with fibers having lengths of 80 Km (L=80 Km) and 120 Km (L=120 Km). The chirp characteristics of a multi-quantum well semiconductor modulator differ from those of a Lithium niobate modulator in that absorption is significant, and the phase and absorption vary nonlinearly with the applied voltage. The chirp characteristics, and ultimately the system performance, depend on the variation of the phase and absorption, as well as the portion of the optical power in each arm. In FIG. 5 the results of the above measurements are plotted. The curves based on the solid circles are for a MQW semiconductor modulator wherein the absorption coefficient $\Delta\alpha$ and phase constant $\Delta\beta$ are given by the formulae:

$$\Delta\alpha = 4_\pi \lambda / 1.05 \times 10^{-9} |V|^7$$

$$\Delta\beta = 2_\pi \lambda / 4.30 \times 10^{-5} V^2$$

where $\lambda$=the optical wavelength, and

V=the modulating voltage.

The curves joining the solid circles, i.e., A, B and C show receiver sensitivity as a function of the portion of optical power in arm 18 for 120 Km, 80 km and 0 Km respectively.

These curves clearly indicate that there is an optimum value of the splitting ratio which is dependent on the fiber length. As shown, with no fiber, i.e., L=0 Km (curve C) it is beneficial to have a greater portion of the optical power in the arm having the greater absorption. Curves for fiber lengths of 80 km (curve B) and 120 Km (curve C) indicate that it is better to have more optical power in the arm with less absorption as this creates more negatively chirped pulses. By extrapolating these results it can be shown that for the same receiver sensitivity the fiber length can be increased from 120 Km to 132 Km by changing the splitting ratio from 50:50 to 38:62.

In FIG. 5 the curves based on the open circles, i.e., Curves A', B' and C' illustrate results for a similar test when the modulator has no modulation dependent absorption.

Note that for equal optical power in each arm of a III–V modulator a symmetric push-pull drive configuration generates slightly negatively chirped pulses in contrast to chirp-free pulses obtained with a lithium niobate modulator under the same drive conditions. By changing the optical power in arm 18 it is possible to reduce or increase the frequency chirp and even change its sign. A proper choice of splitting ratio leads to an improvement in the receiver sensitivity for fiber lengths of 80 km and 120 Km, despite the reduction in extinction ratio.

Figure 6:
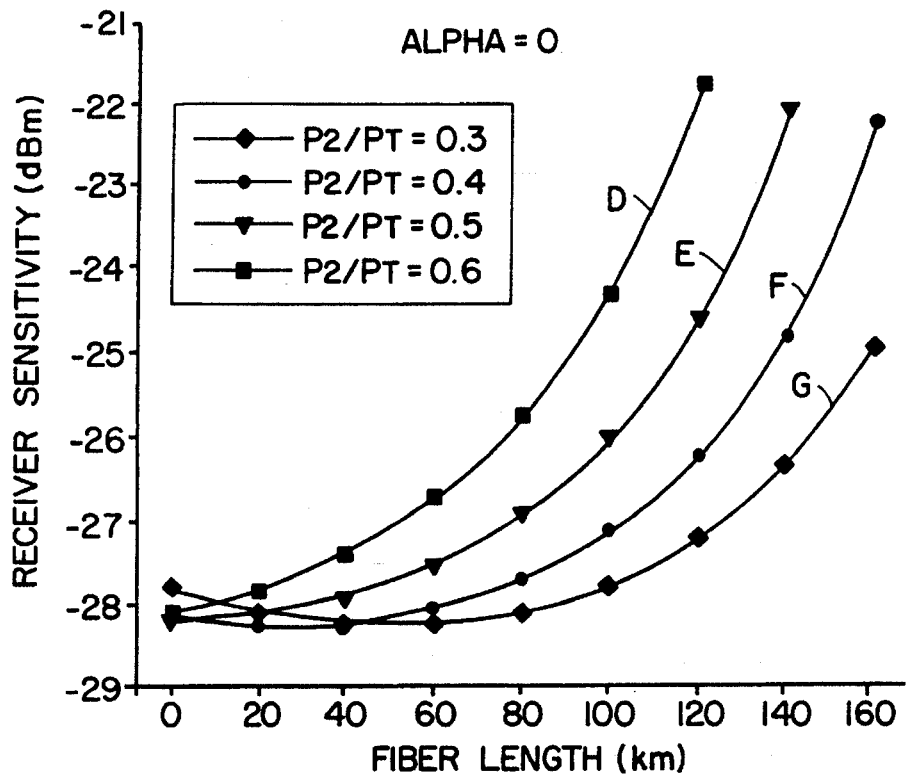
FIG. 6 shows the dependence of the receiver sensitivity on fiber length for different optical power splitting ratios with push-pull modulation voltage on a modulator having no modulation dependent absorption and phase which varies linearily with voltage.

FIG. 6 illustrates the relationship between receiver sensitivity and fiber length for different optical power ratios and a modulator having no modulation dependent absorption and phase that varies linearly with voltage. This shows the effect of a splitting ratio of the splitter or input Y-branch waveguide for other types of modulators such as lithium niobate. The solid squares (Curve D) refer to a case wherein 60% of the total optical power is in arm 18. The solid triangles (Curve E) is for equal optical power in each arm.

The solid circles (Curve F) represent 40% in arm 18 and finally the solid diamonds (Curve G) shows the relationship with 30% of the total power in arm 18. These values were determined with approximately equal pushpull modulation voltage on the two arms.

Figure 7:
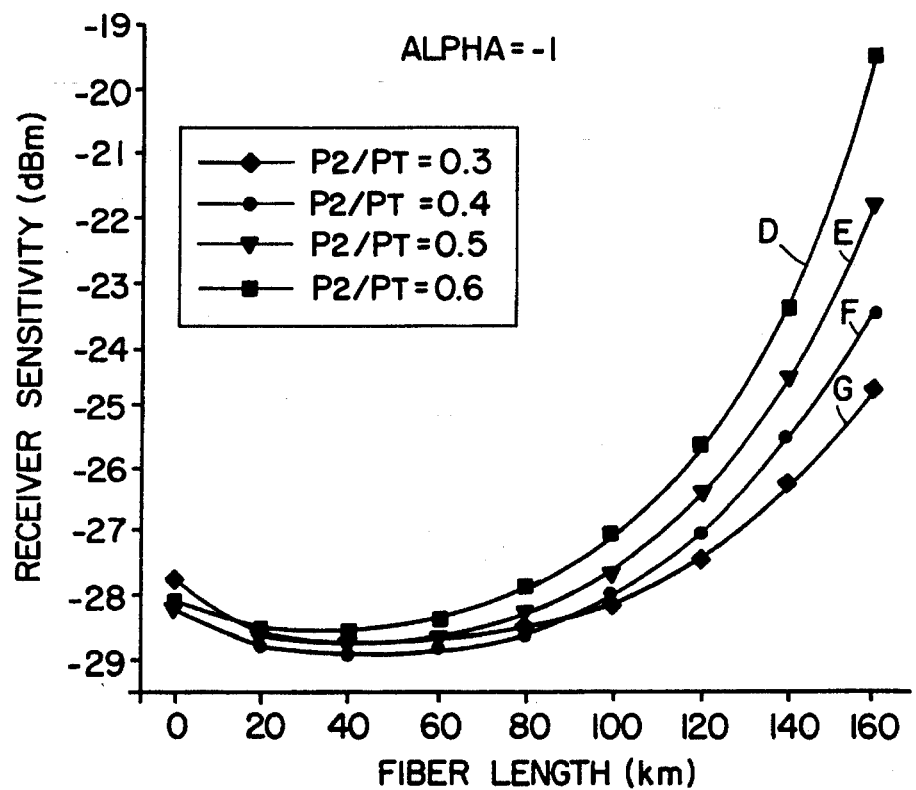
FIG. 7 shows the dependence of the receiver sensitivity on the fiber length for different power splitting ratios on the modulator of FIG. 6 with single arm modulation and negative chirp mode.

FIG. 7 illustrates the relationship of receiver sensitivity vs. fiber length for the same optical splitting ratios with single arm modulation and negative chirp mode according to conditions previously set out, i.e., no modulation dependent absorption.

These results establish that chirp in a Mach-Zehnder optical modulator can be controlled by both modulation means and by adjusting the ratio of optical power through each arm of the device. In accordance with a preferred embodiment the modulator can be operated under symmetrical or equal push-pull modulation voltage while adjusting the chirp by varying the optical power splitting ratio.

The principle applies regardless of the absorption coefficient of the arms of the modulator meaning that the chirp may be controlled in this manner in both III–V modulators and modulators fabricated in other materials such as lithium niobate.

The foregoing discussion also does not preclude the implementation of an asymmetric Mach-Zehnder modulator wherein one of the waveguide arms is longer than the other.

Although preferred embodiments of this invention have been disclosed, it is to be understood that the alterations or variations can be made without departing from the scope of the invention as defined by the appended claims. For example, equal or approximately equal push-pull modulating voltage may be preferred for low drive power requirements, but it is to be understood that for certain applications it will be beneficial to have asymmetrical modulating voltage.

We claim:

1. A Mach-Zehnder optical modulator for providing a modulated optical output signal having variable frequency chirp comprising:
    an optical waveguide splitter for receiving and splitting optical input signal into unequal first and second optical beams;
    first and second waveguide arms joined to said waveguide splitter for receiving and transferring therethrough said first and second optical beams;
    an optical waveguide combiner joined to said first and second waveguide arms for receiving and combining said first and second optical beams into said modulated optical output signal;
    electrodes on each of said first and second waveguide arms for receiving a modulating voltage; means for adjusting the splitting ratio of said optical input signal between said unequal first and second optical beams for controlling a frequency chirp of said output signal.

2. A Mach-Zehnder optical modulator as defined in claim 1 said waveguide splitter being an asymmetrical waveguide splitter.

3. A mach-Zehnder optical modulator as defined in claim 2, said asymmetrical waveguide splitter being a y-branch waveguide.

4. A Mach-Zehnder optical modulator as defined in claim 2, said asymmetrical waveguide splitter being a directional coupler.

5. A Mach-Zehnder optical modulator as defined in claim 1, one of said first and second waveguide arms being supplied with a modulating voltage.

6. A Mach-Zehnder optical modulator as defined in claim 1 both of said first and second waveguide arms being provided with a modulating voltage.

7. A Mach-Zehnder optical modulator as defined in claim 6, the modulating voltage supplied to said first and second waveguides being phase shifted by substantially 180°.

8. A Mach-Zehnder optical modulator as defined in claim 7, the amplitude of the modulating voltage supplied to said first and second waveguide arms being substantially equal.

9. A Mach-Zehnder optical modulator as defined in claim 1, fabricated in a III–V semiconductor alloy.

10. A Mach-Zehnder optical modulator as defined in claim 9, said III–V semiconducting alloy being InGaAsP.

11. A Mach-Zehnder optical modulator as defined in claim 10, said first and second waveguide arms having multi-quantum-wells.

12. A Mach-Zehnder optical modulator as defined in claim 1 fabricated in lithium niobate.

13. A method-off varying the frequency chirp of a modulated optical signal using a Mach-Zehnder optical modulator, the modulator comprising an optical waveguide splitter, an optical waveguide combiner, first and second waveguide arms between said splitter and said combiner, and electrodes associated with each of said first and second waveguide arms for receiving modulating voltage, the method comprising:
    supplying an optical signal to be modulated to said optical splitter to split said optical signal into unequal first and second beams;
    transferring said first and second optical beams through said first and second waveguide arms respectively;
    combining said first and second optical beams in said combiner to generate an optical output;
    modulating said optical output by supplying a modulating voltage to at least one of said first and second waveguide arms; and
    varying the frequency chirp of said optical output by adjusting the splitting ratio of said optical input signal between said unequal first and second optical beams.

14. A method as defined in claim 13, the relative strengths of said first and second optical beams being adjusted by an asymmetrical y-branch optical waveguide splitter.

15. A method as defined in claim 13, the modulating voltage being supplied to both of said first and second waveguide arms.

16. A method as defined in claim 15, the modulating voltage supplied to said first and second waveguide arms having substantially equal amplitude and phase shifted by 180°.

* * * * *